Figure 1:
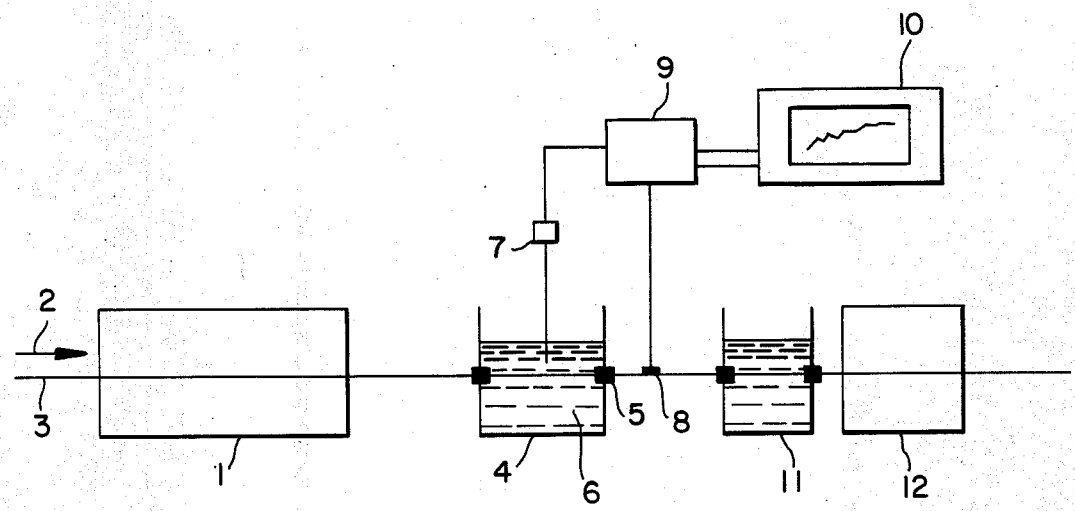

United States Patent [19]

Lefebvre et al.

[11] Patent Number: 4,808,276

[45] Date of Patent: Feb. 28, 1989

[54] METHOD FOR CHECKING IN A MOVING MODE THE CONTINUITY OF A METAL COVERING ON A METAL WIRE OF DIFFERENT NATURE

[75] Inventors: Jacques Lefebvre, Voiron; Philippe Gimenez, Grenoble; Gabriel Colombier, Saint Egreve; Armand Golay, Moirans; Jean S. Safrany, Nancy, all of France

[73] Assignee: Aluminium Pechiney, Paris, France

[21] Appl. No.: 19,667

[22] Filed: Feb. 22, 1987

[30] Foreign Application Priority Data

Jan. 6, 1987 [FR] France ................. 87 00853

[51] Int. Cl.⁴ ................. C25D 5/04; C25D 21/12
[52] U.S. Cl. ................. 204/28; 118/712; 204/211; 204/434; 204/1 T; 324/515; 324/522; 324/558; 427/8
[58] Field of Search ................. 204/434, 401, 1 T, 28, 204/206, 207, 208, 209, 210, 211, 231, 407, 406; 427/8, 9, 10; 118/712; 324/514, 515, 522, 536, 541, 557, 558

[56] References Cited

U.S. PATENT DOCUMENTS

| | | | |
|---|---|---|---|
| 1,530,833 | 3/1925 | Keeler | 204/407 X |
| 1,684,645 | 9/1928 | Smith et al. | 204/407 X |
| 2,184,338 | 12/1939 | Ennis | 204/407 X |
| 3,649,472 | 3/1972 | Morissey et al. | 204/1 T |
| 4,104,579 | 8/1978 | McIvor | 324/557 X |
| 4,370,210 | 1/1983 | Yoshihara et al. | 204/140 |
| 4,492,615 | 1/1985 | LeFebvre | 204/28 |

OTHER PUBLICATIONS

K. F. Greene et al., IBM Tech. Disclosure Bulletin, vol. 7, No. 3, Aug. 1964.

Primary Examiner—G. L. Kaplan
Attorney, Agent, or Firm—Dennison, Meserole, Pollack & Scheiner

[57] ABSTRACT

A method is disclosed for checking and obtaining in a moving mode the continuity of a metal covering on a metal wire of different nature belonging to the group of a wire being treated by a current strength and issuing from a covering bath and wire, the treatment of which is achieved and coming from a storage wheel. The method comprises continuously bringing the coated wire in contact with a volume of electrolyte solution chemically and physically inert with respect to the wire, and in which the sensitive part of a reference electrode is immersed, sliding the wire issuing from the volume against an electrical contact, measuring the electrical potential variations between the electrode and the contact, and when the potential current oscillates, noting the poorly covered wire and increasing the current strength on the wire being treated.

3 Claims, 4 Drawing Sheets

METHOD FOR CHECKING IN A MOVING MODE THE CONTINUITY OF A METAL COVERING ON A METAL WIRE OF DIFFERENT NATURE

The invention concerns an apparatus for checking in a moving mode the continuity of a metal covering on a metal wire of different nature and electrochemical potential.

U.S. Pat. No. 4,492,615 claims a process for covering a great length of metal with a metal layer adhering thereto, by electrolysis in a continuous mode and at a high speed of movement.

That process is applied in particular to nickel plating wires of aluminium or aluminium alloys which are intended to be used in particular as electrical conductors. Indeed, such a covering gives the wire a low level of contact resistance which remains stable with the passage of time and permits copper advantageously to be replaced by aluminium for producing most industrial or domestic single-wire or multi-wire conductors.

However, in order for the level of stability of the contact resistance to be maintained with the passage of time, it is necessary for the covering to be in as continuous a condition as possible.

As the thickness of nickel is generally very small and of the order of a micron, it only needs a fleeting mishap on the production line or poor conditioning or packaging of the wire produced, for the covering to suffer from heterogeneities or breaks therein, so that the continuity of the covering is interrupted. It is therefore a matter of interest to provide an apparatus which makes it possible to check the continuity of the covering and which can serve both as an acceptance test for the user and as a quality control means for the manufacturer.

It will be apparent that, by virtue of the form of the product and the way in which it is obtained, the apparatus must be such that it can be applied in a moving mode and can thus give an instantaneous response.

Now, the conventional methods used for checking the continuity of the coverings on a metal wire generally involve using chemical reactants and are therefore essentially discontinuous. Moreover, they are only applied to copper wires which are tin-plated, nickel-plated or silver-plated, and not to nickel-plated aluminium wires.

It is for that reason that the applicants sought and developed an apparatus for checking, in a moving mode, the continuity of a metal covering on a metal wire, characterised in that it comprises:

a cell of electrically insulating material, the lateral walls of which are provided with two openings so disposed that the wire to be checked which passes between same is brought into contact with a solution of electrolyte which at least partially fills said cell and in which the sensitive part of a reference electrode is immersed, an electrical contact which slides on the wire issuing from the cell, and a millivoltmeter connected on the one hand separately to the contact and to the electrolyte and on the other hand to a recording means.

Thus, the apparatus according to the invention firstly comprises a cell, that is to say, a container, which may or may not be closed by a cover and which is made of a material such as glass or a plastics material or a metal which is covered internally with an insulating covering. The container is provided on the side walls thereof with two openings provided with sealing means and within which the wire to be checked passes. It contains a solution of electrolyte in a sufficient amount for the wire to be completely immersed. The solution which is to be chemically and physically inert with respect to the wire and the material constituting the cell is preferably an aqueous solution of boric acid in a level of concentration of between 1 g/l and saturation at the the temperature which can be withstood by the reference electrode.

The sensitive end of a reference electrode which may be for example a saturated calomel electrode dips into that solution. A sliding electrical contact is placed on the wire which issues from the cell. The electrode and the contact are connected to a millivoltmeter in such a way as to be capable of measuring the potential difference between the wire and the reference electrode, which measurement is continuously transmitted to a recording means.

The millivoltmeter must have a high input impedance, preferably of higher than $10^9 \Omega$, so as to avoid a slow degradation in the reference electrode and in consequence drift in the measurement results. The configuration of the curve obtained at the recording means indicates whether the covering is continuous or not.

Indeed, it has been observed that, whether the curve results from a measurement carried out on a wire when it issues from the tank in which the covering is produced and which therefore carries voltage, or on a covered wire which carries no voltage, coming from a storage reel, the curve had certain characteristics which were related to the quality of the covering.

In particular, in the former case, as long as the covering is heterogeneous, the potential difference is unstable, which is revealed by oscillations of greater or lesser magnitude but of substantial frequency, whereas once the covering becomes homogeneous, the potential difference stabilises. Thus, in production of the covering, it is possible to find operating conditions which make it possible to attain that stability and consequently a suitable quality of wire.

In the second case, it is noted that there are also variations in potential on a poorly covered wire whereas that potential is constant on a high-quality wire.

The accompanying drawings illustrate the invention.

Figure 2:
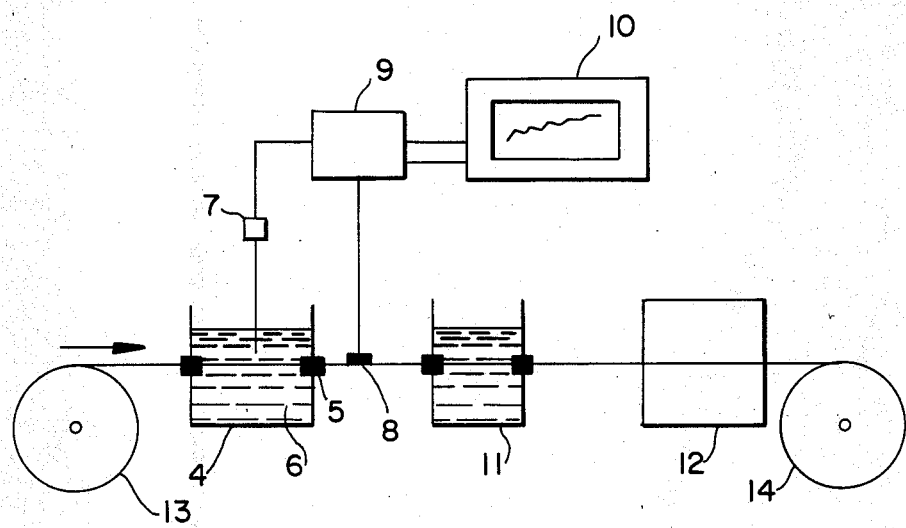
Figure 3:
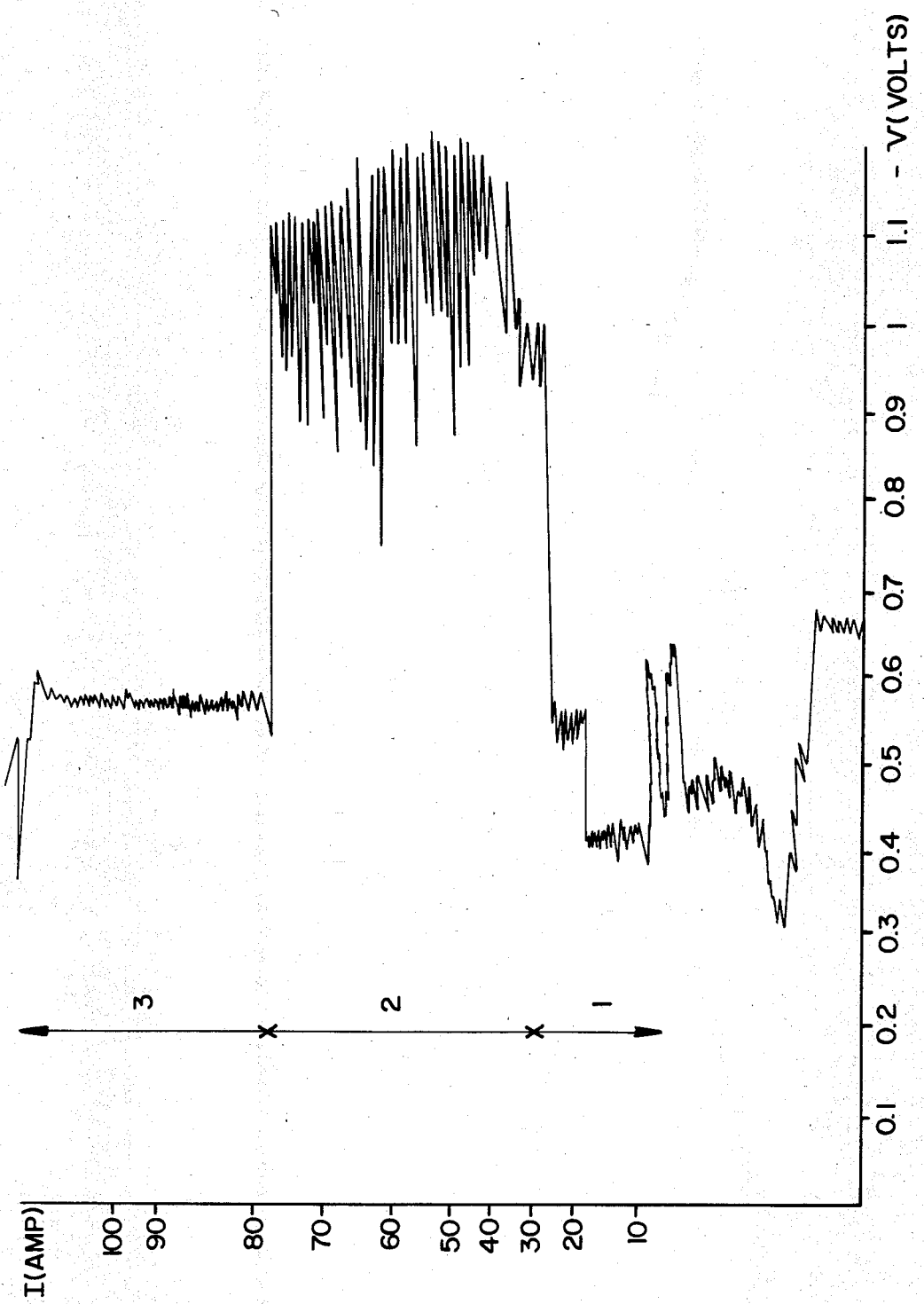
Figure 4:
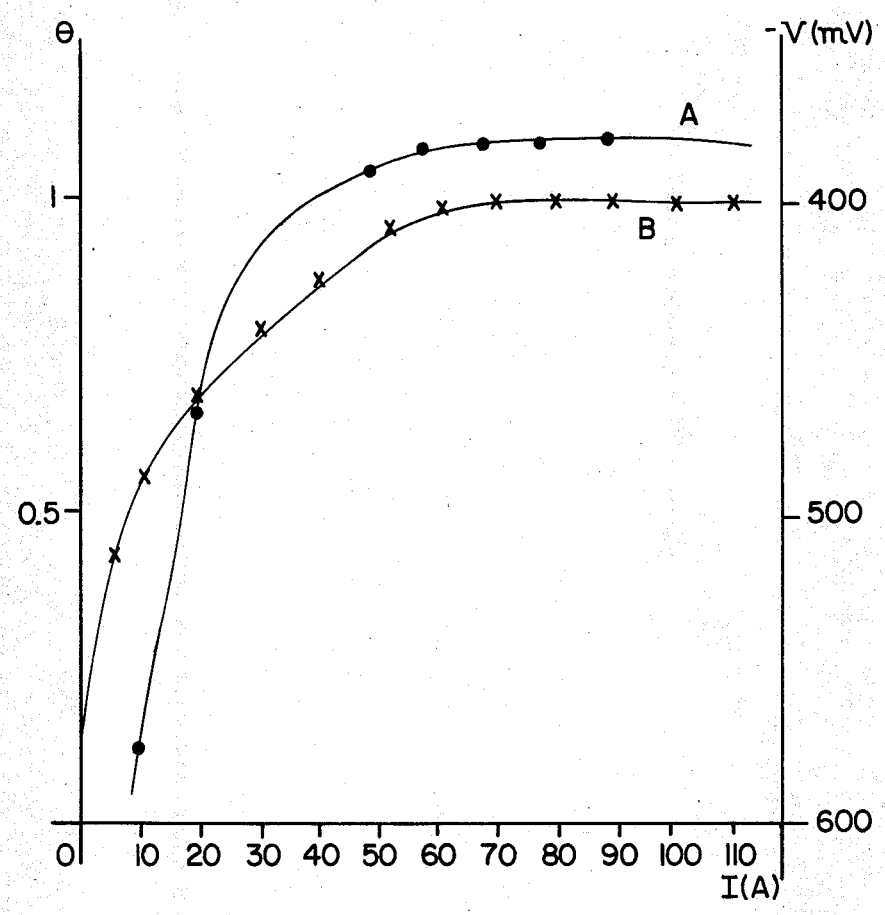
Figure 5:
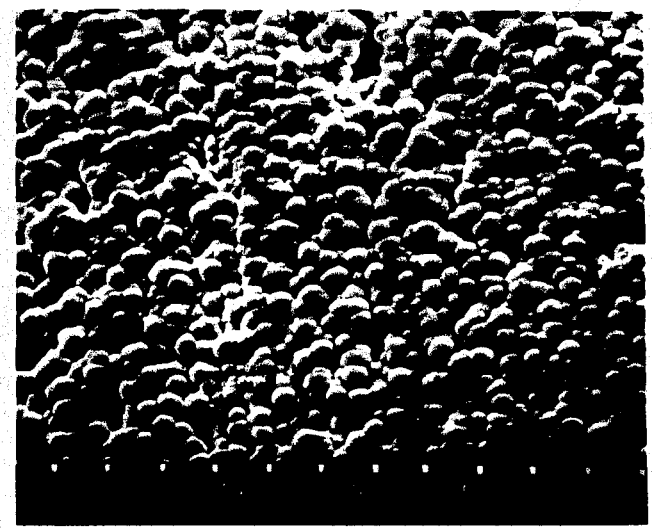

FIGS. 1 and 2 respectively correspond to the apparatuses used for checking on the one hand a wire which carries voltage, issuing from the covering bath, and on the other hand a wire which does not carry voltage, coming from a storage reel, FIG. 3 shows the potential curve obtained on a covering line by varying the strength of the deposit current, FIG. 4 shows the curves in respect of potential and the degree of covering of a wire in dependence on the current strength at which it was treated, and FIG. 5 shows a micrograph of a covering.

Referring to FIG. 1, shown therein is a covering or coating bath 1 through which the wire 3 passes in the direction indicated by the arrow 2, and the apparatus according to the invention comprising a cell 4 provided with sealing means 5 and containing a solution 6 into which dips a reference electrode 7, an electrical contact 8 which slides against the wire, a millivoltmeter 9 which is connected separately to the reference electrode and to the contact and a recording means 10 for displaying the result of the checking operation. The apparatus also comprises a rinsing tank 11 for removing the solution from the wire and a wire drying system 12.

Referring to FIG. 2, shown therein is the same apparatus as described above, which is no longer supplied with the wire issuing from the covering bath 1, but a covered wire coming from a reel 13, the wire then being wound on the reel 14 after the checking operation.

FIG. 3 which relates to production control shows the values in respect of potential in volts with respect to the saturated calomel electrode, which are given by the recording means in dependence on time and the different current strengths which are applied in steps to form a covering of nickel on a wire of aluminium or aluminium alloy, with a diameter of 0.51 mm, moving at a speed of 100 meters per minute, in accordance with the process claimed in U.S. Pat. No. 4,492,615 namely successively passing the wire into a liquid current supply means containing nickel chloride, boric acid and hydrofluoric acid and then through a covering bath based on nickel sulphamate also containing boric acid and nickel chloride.

Three ranges as indicated at 1, 2, 3 may be distinguished, according to increasing values in respect of current strength:

range 1: at low strength, the potential oscillates. On examination, the nickel obtained has a low level of covering capacity;

range 2: as from 30 amperes, the potential rises rapidly and the recorded signal oscillates greatly. That corresponds to an unfavourable modification in the chemical nature of the deposit; and range 3: for strengths of close to 80 amperes, the recorded signal becomes very stable and no longer varies when the strength rises, indicating that the degree of covering is at a maximum.

On the basis of those recordings, for each particular situation involving a covering, irrespective of the nature of the substrate, the diameter thereof and the speed of its movement, it is possible to determine the optimum conditions in respect of current density to provide a homogeneous covering which satisfies the required function.

FIG. 4 which relates to a nickel-plated wire which is unwound from a storage reel gives the curve A in respect of potential in mV in dependence on current strength in amperes to which the wire was subjected upon treatment thereof, while curve B gives the degree of covering $\theta$ = nickel surface area/ substrate surface area, in dependence on the same current strengths.

Those curves show the correlation which exists between measured potential and the degree of covering. It will be seen in particular that, when the covering attains 100%, the potential no longer varies. Thus, by measuring the level of potential and verifying the degree of stability thereof, it is possible to deduce therefrom that the wire complies with the requirement for continuity of the covering, which is imposed by the user.

FIG. 5 is a micrograph with an enlargement of 3000 of a wire on which the degree of covering is close to 100%.

The invention finds application in checking, while on the move, of any metal substrate covered with another metal, in particular nickelplated aluminium wires, in respect of which there is a wish to be sure of the continuity and quality of the covering and more particularly when dealing with electrical conductors.

We claim:

1. Method for checking and obtaining in a moving mode the continuity of a metal covering on a metal wire of different nature belonging to the group of a wire being treated by a current strength and issuing from a covering bath and wire, the treatment of which is achieved and coming from a storage wheel consisting in:

bringing continuously the coated wire in contact with a volume of an electrolyte solution chemically and physically inert with respect of the wire and in which the sensitive part of a reference electrode is immersed;

sliding the wire issuing from the volume against an electrical contact;

measuring the electrical potential variations between the electrode and the contact; and when the potential current oscillates, noting the poorly covered wire and increasing the current strength on the wire being treated.

2. Method according to claim 1, wherein the solution is boric acid at a level of concentration between 1 g/l and saturation at the operating temperature.

3. Method according to claim 1, wherein the wire is a nickel-plated wire of aluminium or aluminium alloy for electrical use

* * * * *